United States Patent [19]
Höfler

[11] 3,877,150
[45] Apr. 15, 1975

[54] GEAR GENERATING MACHINE FOR MAKING AND TESTING INVOLUTE GEARS

[76] Inventor: Willy Höfler, 35, Fridtjof-Nansen-Strasse, Karlsruhe, Germany

[22] Filed: Oct. 18, 1973

[21] Appl. No.: 407,481

Related U.S. Application Data

[63] Continuation of Ser. No. 118,683, Feb. 25, 1971, abandoned.

[52] U.S. Cl................ 33/179.5 D; 90/9; 51/123 G
[51] Int. Cl........................... G01b 5/20; B23b 5/02
[58] Field of Search...................... 90/3, 6, 8, 9, 10; 51/123 R, 123 G, 95 GH; 74/25, 29, 30; 33/179.5 R, 179.5 D

[56] References Cited
UNITED STATES PATENTS
3,624,972  12/1971  Graf................................. 51/123 G
FOREIGN PATENTS OR APPLICATIONS
351,092  6/1931  United Kingdom............... 51/123 G Primary Examiner—Gil Weidenfeld

[57] ABSTRACT

A gear generating machine comprises a table whereon the gear to be machined is placed and a tool carrier which executes a motion relative to the table. The table moves along a rectilinear path and, at the same time, the gear thereon performs a rotatory motion. Both movements together constitute the rolling-off motion of the gear. A stationary guide way is provided on the machine inclined to the direction of the rectilinear table movement. The inclination is adjustable in dependence on the base circle diameter of the gear to be machined. A sliding block is guided in the guide way and is connected with the machine table for movement therewith. During the movement the sliding block is displaced in a direction perpendicular to the direction of the movement on account of the inclined direction of the guide way. Mechanical means are provided for deriving from this perpendicular movement the rotatory motion of the gear which is, thus, in a simple manner positively related to the rectilinear table movement.

9 Claims, 9 Drawing Figures

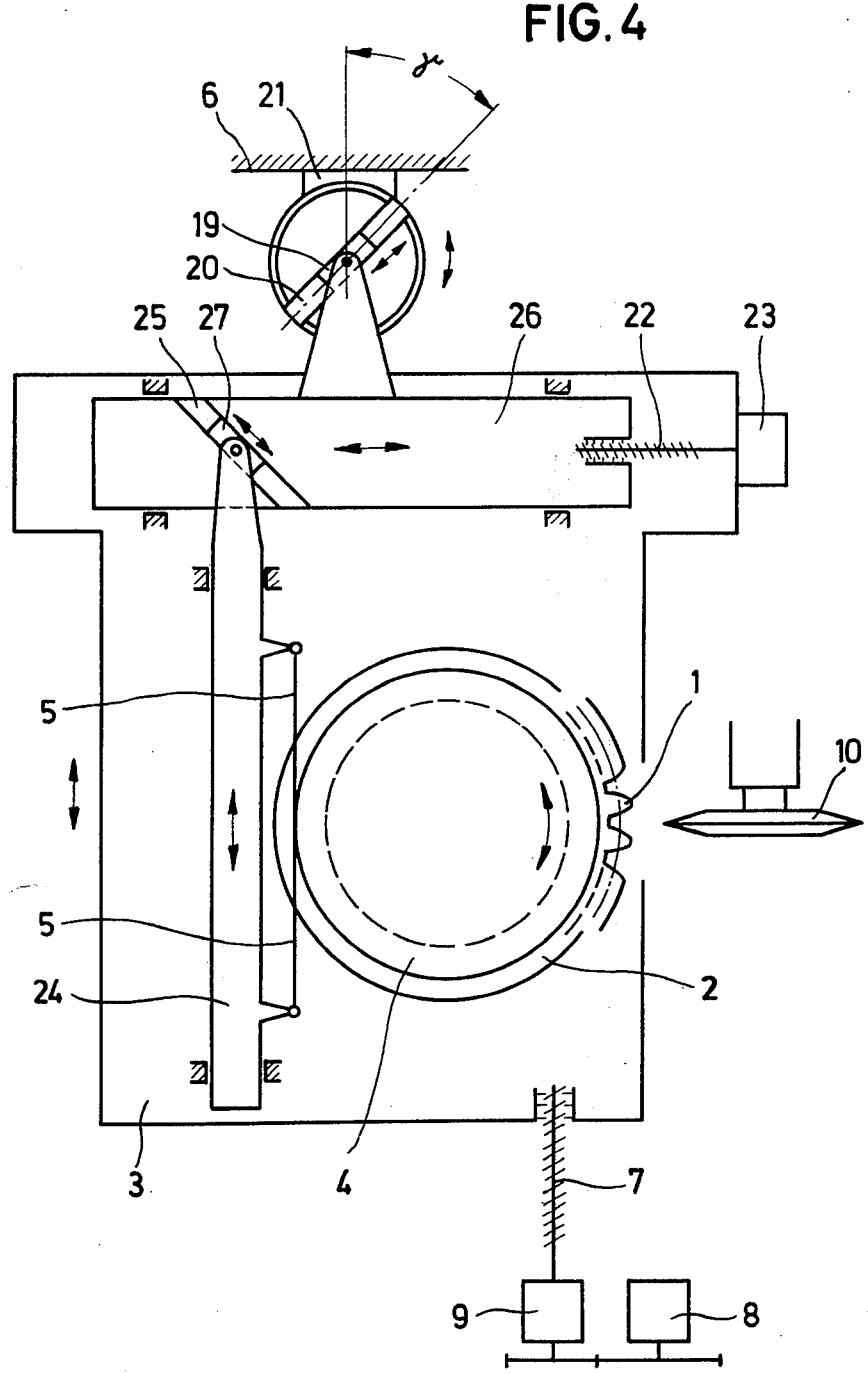

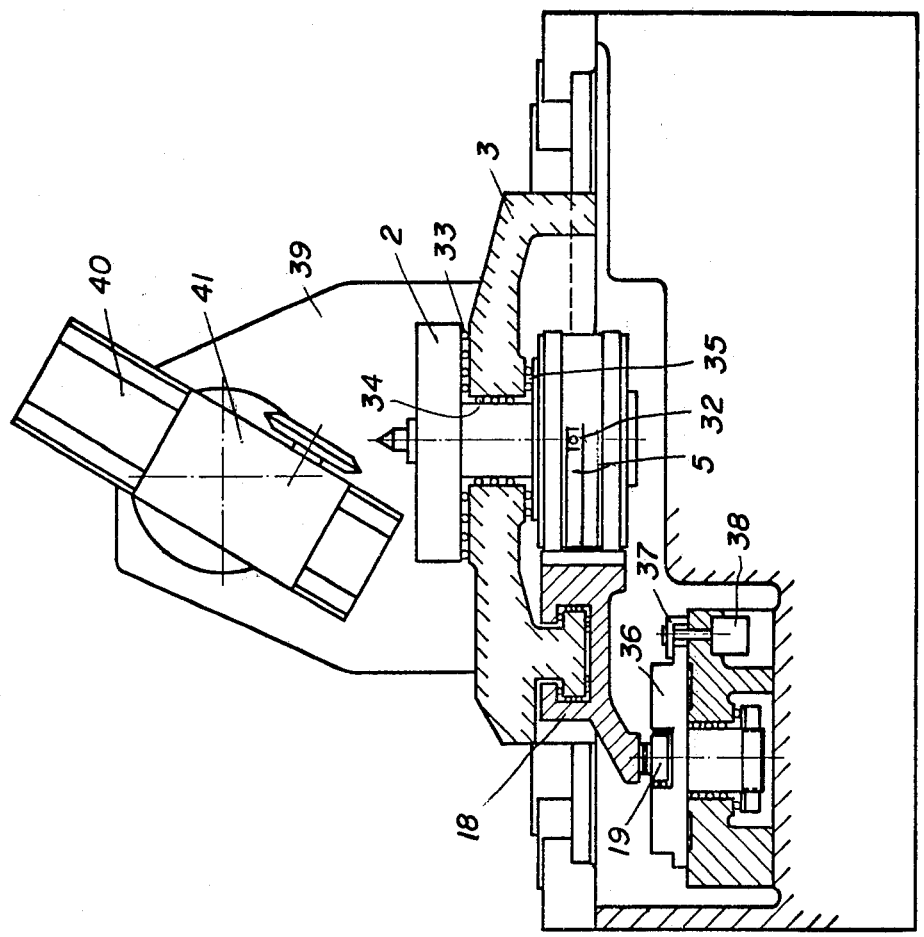

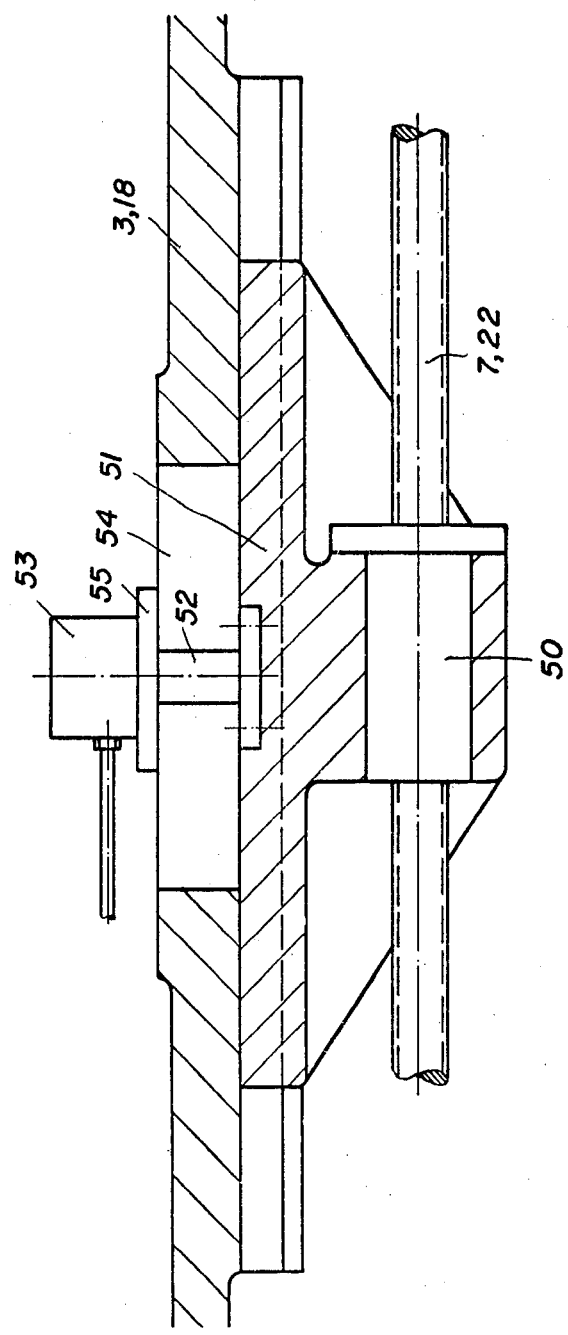

GEAR GENERATING MACHINE FOR MAKING AND TESTING INVOLUTE GEARS

This is a continuation of application Ser. No. 118,683, filed Feb. 25, 1971, now abandoned.

BACKGROUND OF THE INVENTION

1. Field of the Invention

The present invention relates to a gear generating machine. More particularly it pertains to the manner in which the proper rolling-off movement of the workpiece on such a machine is performed. This rolling-off movement comprises a rectilinear component and a rotatory component which are both executed by the workpiece.

2. The Prior Art

In machines of this type the tooth-forming tool usually performs a straight back and forward stroke while, at the same time, the gear to be machined rolls off relative to the tool so that the shaped tooth profile is that of an involute. However, there are also machines known in the art which comprise a stationary tool while the gear performs at the same time both the back and forward stroke and the rolling-off motion.

In order to achieve the proper rolling-off motion, a rectilinear movement is performed by the machine table whereon the workpiece is placed. In addition thereto the workpiece executes a purely rotatory movement of which the angular velocity corresponds to the speed of the rectilinear table movement in such a way that relative to the tool the workpiece rolls off so that the proper involute tooth form is achieved.

For adjusting the rotatory motion to the speed of the rectilinear table movement there are mainly two ways known in the art:

In a first system the rotary motion of the workpiece is generated by means of a cylinder on the machine table whereon the workpiece is positioned concentrically and by two straps which are secured with one end each to opposite sides of the cylinder and with the other ends to opposite stationary portions of the machine. The cylinder, which must have the diameter of the gear to be manufactured, rolls practically on the two straps when the table undergoes a straight movement. In this manner gears can be made with extreme accuracy but it has the disadvantage that a great number of expensive cylinders are required when different gears, having different base circle diameters, are to be made.

In a second system the two components of the rolling-off movement, i.e., the rectilinear movement and the rotatory movement are adjusted relative to one another by speed change gears of which the transmission ratio must be chosen in accordance with the base circle diameter of the gear to be made. A change of gears is, therefore, required if gears of different size, i.e., having different base circle diameters, are to be manufactured. The gears to be changed in the gear box are certainly less expensive than the different cylinders required in the first-described system, but then the accuracy which can be achieved in the second system is much inferior.

It is therefore an object of the present invention to provide a gear generating machine which may be adjusted to different rolling-off motions, corresponding to different base circle diameters from almost zero to infinity in case of a toothed rack, without requiring an exchange of machine parts. It is another object to provide a gear generating machine which does not require cylinders of different size or different speed change gears when differently sized gears are to be manufactured. And it is a further object to provide such a machine which achieves the same degree of accuracy in production as the prior art machines and which is, further, simple and uncomplicated in operation.

SUMMARY OF THE INVENTION

The above stated objects are attained in a gear generating machine by deriving the purely rotatory motion of the workpiece indirectly from the rectilinear movement of the machine table. Means are provided by which from the rectilinear movement the movement of a machine part perpendicular to the rectilinear movement is derived and from this perpendicular movement, in turn, the rotatory motion of the workpiece is generated. As such means a guide way and a block sliding therein are used. The guide way is stationary on the machine but adjustable in its direction relative to the direction of the rectilinear table movement. The block is connected to the machine table for movement therewith and, since the guide way is inclined to the direction of the table movement, is laterally displaced in to this direction. The block movement in the lateral direction includes a component of a movement which is directly perpendicular to the direction of the table movement, and from this perpendicular component is derived the rotatory motion of the workpiece, or rather of the workpiece support on the machine table. By means of a cylinder and two straps the straight perpendicular movement is transformed into the rotatory motion as is already known in the art. The advantage over the prior art is, however, that the cylinder need not be exchanged when differently sized gears are to be machined, it suffices rather to vary the inclination of the guide way relative to the direction of the table movement and to adjust this inclination in dependence on the base circle diameter of the gear to be made.

Of course, in the machine the direction of power flow may be reversed in the sense that the cylinder is the driving element from the rotatory motion of which the rectilinear movement of the table is derived.

By applying a well known sine bar as the guide way in the machine it is possible, simply by adjusting the direction of the sine bar or guide way, to obtain very accurately the rotatory motion of the gear which is required together with the rectilinear table movement, for producing the rolling-off motion during the machining process. The keeping-in-stock of differently sized cylinders or speed gears can thus be dispensed with. Still a high degree of accuracy in machining is guaranteed because the guide way can be mounted solidly in the machine body where its angular position relative to the direction of the table movement remains constant during one particular machining process.

In case the tooth-shaping tool executes a periodical back and forward stroke while the workpiece to be machined undergoes the rolling-off motion by rotating on the rectilinearly moving table, or in case the workpiece executes both the rolling-off motion and the back and forward strokes while the tool remains stationary, it has proven advantageous to mount an element which imparts the rotatory motion slidably on the machine table. The element has a sliding block mounted thereon which engages directly or indirectly the guide way on the machine body. In case the element is slidable on the table in a direction perpendicular to the table movement, the block can engage the guide way directly. However, the element may also be mounted on the table so as to be slidable in the direction of the table movement. In this case there must be provided an additional machine element which is slidable in a direction perpendicular to the direction of the table movement. This additional element has then the block which engages the guide way and it also has a groove wherein a portion of the first element slides. The first element, thus, engages the guide way indirectly. Such a design will prove advantageous when there is danger that a perpendicularly sliding element may collide with the machine stand or with the tool carriage. The design makes it possible to make the distance between the rotatory workpiece support on the table and the additional element as great as necessary in order to avoid any collision.

The machine according to the invention is very simple in design and makes it possible to adjust the rotatory component of the rolling-off motion exactly to the base circle diameter of the gear to be made.

The sliding element may be a toothed rack which is in mesh with a gear connected to the workpiece support. However, the accuracy of manufacture is significantly increased if the element is used as a part of the known cylinder and strap mechanism.

In case the flow of power in these particular machine elements is reversed, the rotating workpiece support will be the driving element and the machine table will be the driven element. The workpiece support with the workpiece placed thereon will be driven directly and from this rotatory motion the rectilinear movement of the table will be derived. The source of the rolling-off motion is no longer the rectilinear movement but the rotatory motion. The directly driven workpiece support generates the perpendicular movement of the element, which movement is, in turn, transformed into the table movement along a straight path, which represents the rectilinear component of the rolling-off movement. As will be described in more detail below, with this reversed flow of power better sliding conditions may be achieved in the guide way when the ratio of the cylinder diameter to the base circle diameter of the gear has a certain value.

BRIEF DESCRIPTION OF THE DRAWINGS

The invention will be more readily comprehended from the following description when taken in conjunction with the appending drawings, wherein:

FIG. 4 is a schematic illustration of the elements of the invention for generating the rolling-off motion in a second embodiment.

FIG. 5 is a structural cross-section of the line V—V of the arrangement shown in FIG. 3a;

FIG. 6 is a detail; and

DESCRIPTION OF THE PREFERRED EMBODIMENTS

Figure 1:
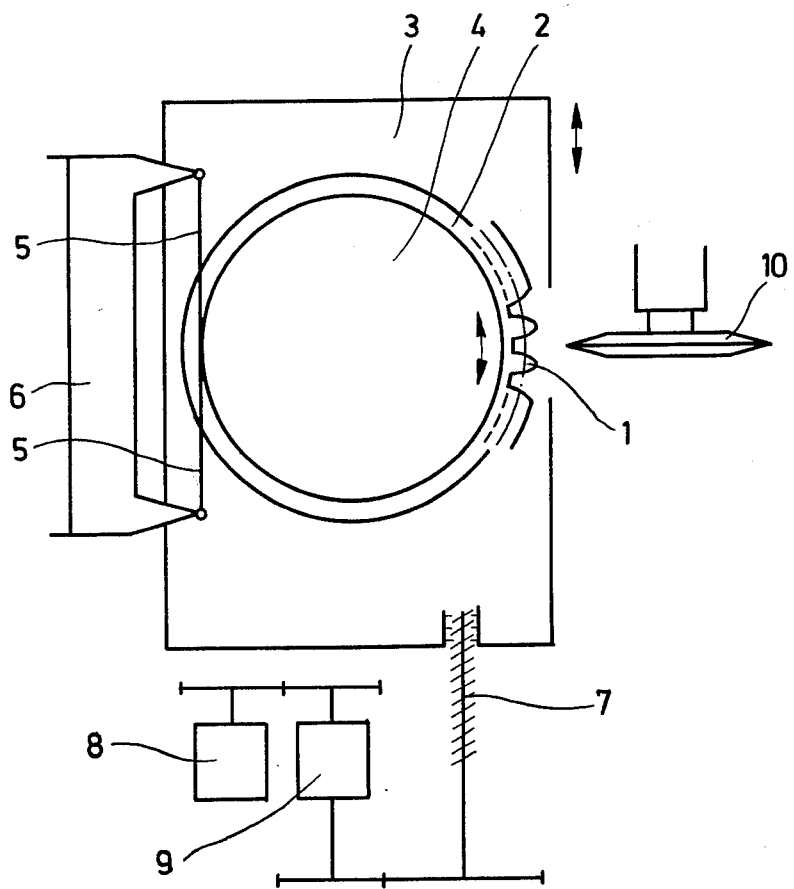
FIG. 1 is a schematic illustration of a first prior art method of generating the rolling-off motion of the gear to be made in a gear generating machine.

Referring now to the drawings, FIG. 1 shows a gear 1 to be manufactured mounted on a workpiece support 2 which is rotatable on a machine table 3. The workpiece support 2 comprises a cylinder 4 of which the diameter corresponds exactly to the base circle diameter of the gear 1. On opposite sides of the cylinder 4 there are fixed the ends of two straps 5. The two other ends of the straps 5 are fixedly mounted on a portion 6 of the machine stand. A lead screw 7 is driven by a motor 8 through a feed-gear mechanism 9. The tooth-shaping tool of the machine is represented by a grinding wheel 10.

In FIG. 1 it should be noticed that the straps 5 together with the machine stand portion 6 are in practice arranged on the same side as the grinding wheel 10 so that relative to this tool the rolling-off motion of the gear may take place. The side-inverted illustration of FIG. 1 was chosen merely for sake of clearness and simplicity.

This prior art. machine operates in the following manner: By the lead screw 7, driven by motor 8, the machine table 3 is moved along a rectilinear path. This causes the cylinder 4 to roll off the stationary straps 5 and, thus, to rotate the gear 1 which executes a rolling-off motion relative to the tool. During the working process the tool is moved between the gear teeth.

In case a gear is to be manufactured which has a longer or shorter base circle diameter, the cylinder 4 must be exchanged for one which has the same diameter. This requires the manufacture to keep a large stock of cylinders having different diameters.

Instead of the shown grinding wheel 10 two disc shaped grinding wheels or a rack-shaped cutter may be used as the tool.

Figure 2:
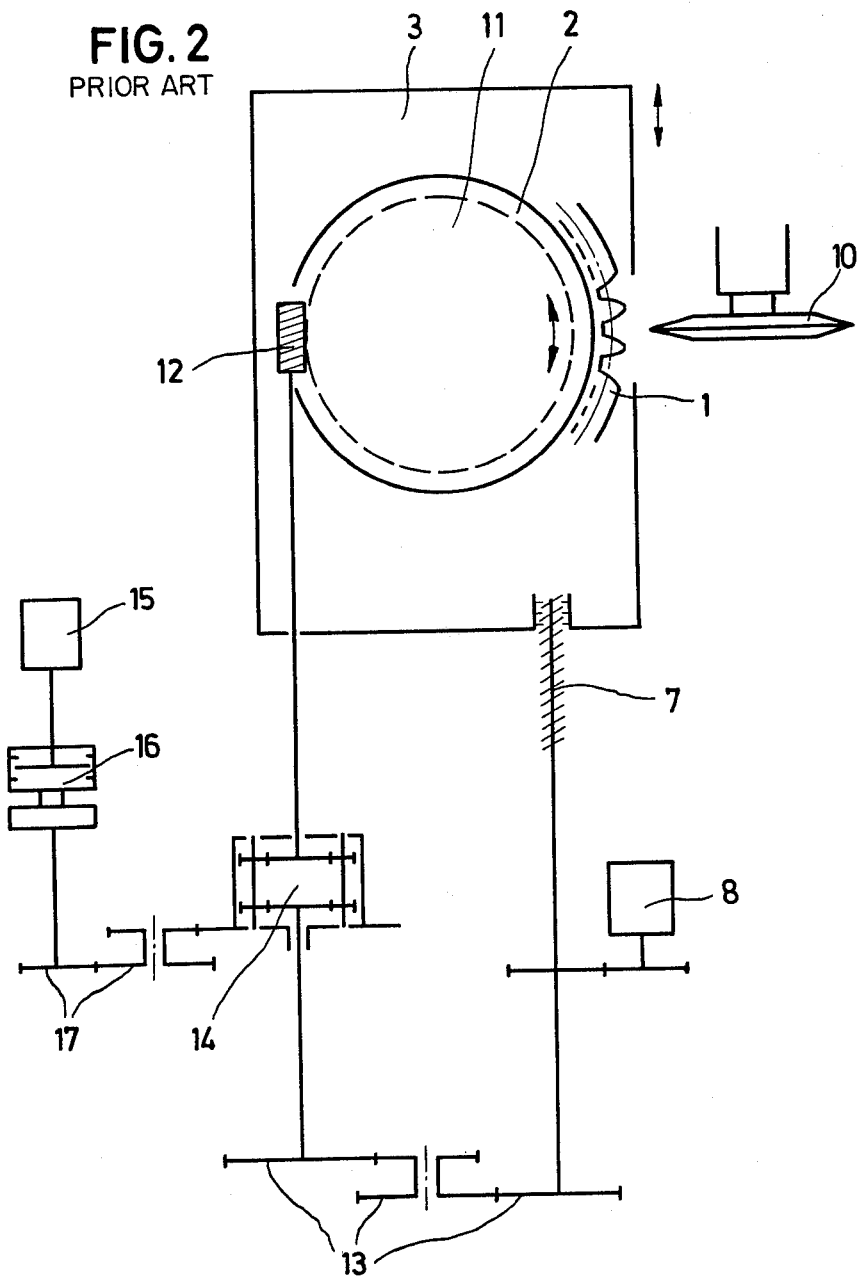
FIG. 2 is a schematic illustration of another prior art method of generating the rolling-off motion of the gear to be made in a gear generating machine.

The machine schematically shown in FIG. 2 is also a prior art machine and differs from the one described above in that the rotatory motion of the gear 1 is not generated by the cylinder and the straps but by a worm 12 and a worm wheel 11; the latter being connected to the gear 1. The worm 12 is driven by the lead screw 7 which is drivingly connected to the worm by means of speed change gears 13 and a differential gear 14. The rotatory motion of the gear 1 may be adjusted to the rectilinear movement of the machine table 3 by changing the transmission ratio of the speed change gears 13, so that the required rolling-off motion of the gear 1 relative to the grinding wheel 10 is achieved.

Besides, the worm 12 is used for indexing the gear 1. For this end an index motor 15 is provided which drives the outer gear ring of the differential gear 14 through an index plate 16 and index gears 17, thereby influencing the number of revolutions of the worm 12. The index motor 15 performs the tripping of the gear 1 from tooth to tooth and also moves the gear through the difference in space between the width of the grinding wheel and the width of the tooth space, after one tooth flank has been finished.

For machining gears having either a longer or a shorter base circle diameter, the transmission ratio between the lead screw 7 and the worm 12, i.e., the ratio between the rectilinear movement and the rotatory motion, has to be changed and adjusted to the particular base circle diameter of the gear to be made by exchanging the speed change gears 13 and the index gears 17.

Figure 3:
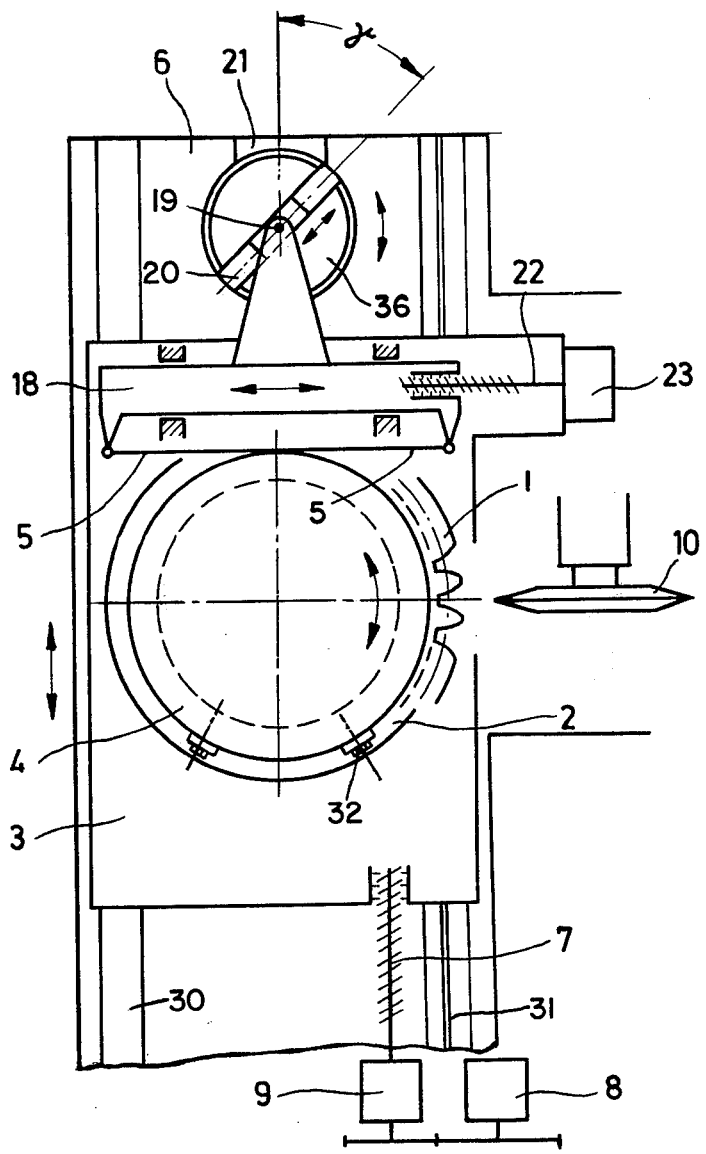
FIG. 3 is a schematic illustration of the elements of the invention for generating the rolling-off motion in a first embodiment.

The machine of the invention is schematically illustrated in FIG. 3. The gear 1 is rotatably supported on the machine table 3. The rectilinear displacement of the table 3 is performed by the lead screw 7 which is driven by the motor 8 through the feed gear mechanism 9. The necessary rotatory motion of the gear 1 is generated by means of a carriage 18 which is mounted on the table 3 to slide in a direction perpendicular to the direction of movement of the table 3.

On the one hand the carriage 18 is the basic element of the well known cylinder and strap control of the gear. On the other hand the carriage 18 is provided with a sliding block 19 which engages slidably a guide way 20. The guide way 20 is pivotable in a housing 21 and may be set to particular position with the help of optical means. The housing 21 is rigidly connected to the machine stand 6.

Figure 3A:
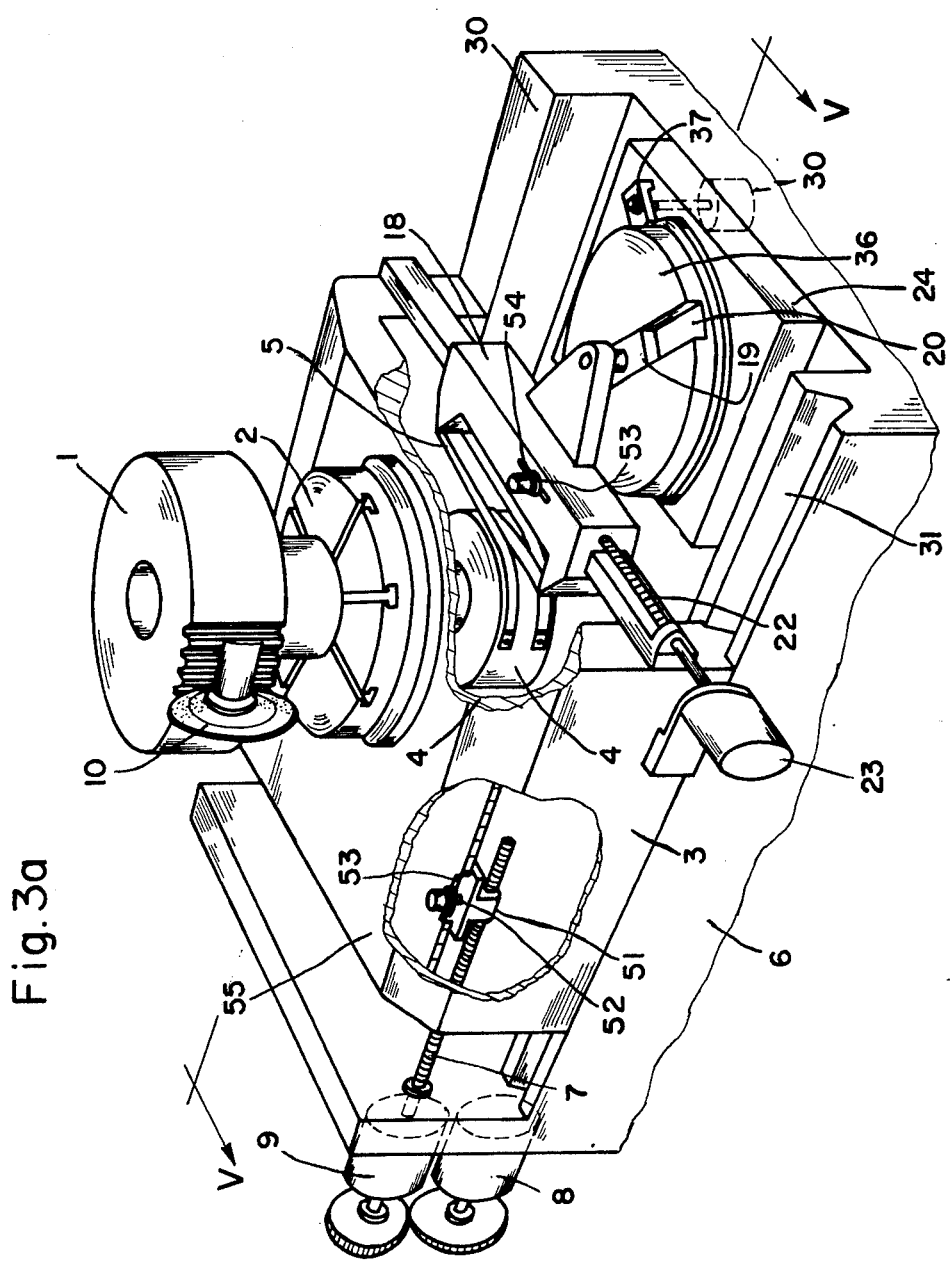
FIG. 3a is a perspective view of the arrangement of FIG. 3.

Referring to FIGS. 3a and 5, the table 3 is mounted to slide in guides 31 in the machine frame 6 in the direction of the arrow. The carriage 18 is mounted to slide transversely of the table. The workpiece support 2 which holds the gear blank is rotatably mounted in the table 3 by bearings 33, 34 and 35. The member 36 is turnably mounted in a block mounted on the machine frame, and it can be held in any desired angular position by one or more clamps 37 engaged in a circular slot in the base and actuated by an hydraulic cylinder arrangement 38. Slot 20 in member 36 engages the slide block 19 pivoted on an extension of carriage 18.

Straps 5 are connected at their ends to the cylinder 2 by bolts 32. Thus longitudinal movement of carriage 18 will result in turning of the cylinder.

An upward projection 39 of the machine base 6 carries an angularly adjustable guide 40 in which is slidable the motor casing 41 for the tool 10. This is reciprocated in the guide by a crank and motor arrangement of a type well known in the art in synchronism with the longitudinal movement of the table 3.

The present invention relates only to the manner of coordinating the turning movement of the cylinder 2 with the sliding movement of the table 3. The remainder of the mechanism is well known (see, for example, Praktische Verzahnungstechnik, Carl Hanser Verlag Munchen, 1943, pp. 136–139; Kolb, Zahnflanken-Schleifmaschinen, z155; Hofler, Zahnrad-Schleifmaschine H300, June, 1969).

However, the machine table 3 may also be driven indirectly by a motor 23 and by means of the carriage 18 and a lead screw 22 which can be coupled and uncoupled to the motor 23.

The invented machine operates as follows: The rectilinear movement of the table 3 generated by the lead screw 7 causes a sliding motion of the block 19 mounted on the carriage 18 in the stationary guide way 20. The block 19 together with the carriage 18 is thereby laterally displaced, in dependence on the angular position of the guide way 20. The lateral displacement is transmitted by the straps 5 to the cylinder 4 and causes a rotatory motion of the latter and, thus, of the gear 1 thereon.

If, for example, the base circle diameter of the gear 1 is equal to the diameter of the cylinder 4 the perpendicular movement of the carriage 18 must be equal to the rectilinear movement of the table 3 driven by the lead screw 7. Only then will the gear 1 execute the proper rolling-off motion relative to the grinding wheel 10. In order to ensure such proper motion, the guide way 20 must be inclined relative to the direction of movement of the table 3 by an angle of exactly 45°. When machining gears of which the base circle diameter is longer or shorter than the diameter of the cylinder 4, it will be sufficient to change the angular position of the guide way 20 to an angle which can be precalculated and preestablished, in order to ensure again the proper rolling-off motion required for making involute gears. Since the guide way 20 can be set very accurately to the preestablished position and, further, since the block 19 slides practically without play in the guide way the degree of accuracy achieved by the machine according to the invention is equal to the degree of accuracy achieved by the prior art machine shown in FIG. 1. The machine according to the invention, however, has the advantage that the ratio of the rotatory motion to the rectilinear movement is continuously variable.

In all instances where the base circle diameter of the gear to be made is greater than the diameter of the cylinder 4, the angle to which the guide way must be set is smaller than 45°. With an increasing base circle diameter of the gear the angle becomes smaller and smaller and will be zero when a toothed rack is made, because when making a rack no rotatory motion at all is required, only a rectilinear movement.

On the other hand, in all instances where the base circle diameter of the gear to be made is shorter than the diameter of the cylinder 4, the angle $\gamma$ to which the guide way must be set is greater than 45°. However, with a decreasing base circle diameter the angle $\gamma$ will soon become so great that the frictional resistance of the block 19 in the guide way 20 becomes self-locking and, thus, prevents a further drive of the gear 1 by way of the carriage 18 and the straps 5.

It is, therefore, proposed to reverse the powr flow whenever the ratio of the diameter is so that the angle of the guide way inclination $\gamma$ becomes greater than 45°. This means, it is proposed to drive the gear 1 directly to perform a rotatory motion and to derive the rectilinear table movement from the rotatory gear motion. To this end the lead screw 7 is decoupled from the machine table, while the second lead screw 22 is coupled to the carriage 18; the latter being then driven by the motor 23. Then the guide way 20 may be set to increasingly greater angles $\gamma$ corresponding to increasingly smaller base circle diameters of the gears without there being any danger of self-locking by friction. The greater the angle $\gamma$ becomes the smaller becomes the rectilinear component of the rolling-off motion which is now transmitted from the cylinder 4 through the carriage 18 to the block 19 and to the machine table 3.

The coupling and decoupling of the lead screws 7 and 22 can be accomplished by the arrangement shown in FIG. 6.

A nut 50 threadedly engaged on the lead screw is secured in a block 51 slidably mounted on guides on the part 3 (or 18). A pin 52 secured in this block extends through a slot 54 in the part 3 (18). A plate 55 slidable on pin 52 and located on the other side of the part 3 (18) from the block 51, and wider than the slot 54 is actuated by an hydraulic cylinder arrangement 53 carried by pin 52, so that it can be pressed against or released from the upper face of the part 3 (18).

Instead of the cylinder and straps there may, of course, a friction disc may be employed while the carriage 18 is then a friction bar.

In case a lower degree of accuracy can be tolerated, the cylinder and the straps may be replaced by a gear connection, i.e., the carriage may be provided with a toothed rack which meshes with a spur gear provided in the place of the cylinder.

Further, it will readily be understood that it is considered to be well within the scope of the invention if the tool, for example the grinding wheel 10, is replaced by a tracer 10' (see FIG. 7) so that the machine according to the invention may also be employed for tracing the involute shape of the tooth flanks of gears having different base circle diameters. During the testing process the back and forward stroke of the tool can be dispensed with. The tooth flanks are only rolled past the tracer. The tracer may be mounted stationarily on the machine stand. The testing of the tooth flank may, therefore, not only be performed with the same machine but along with the finishing process of the gear.

Figure 4A:
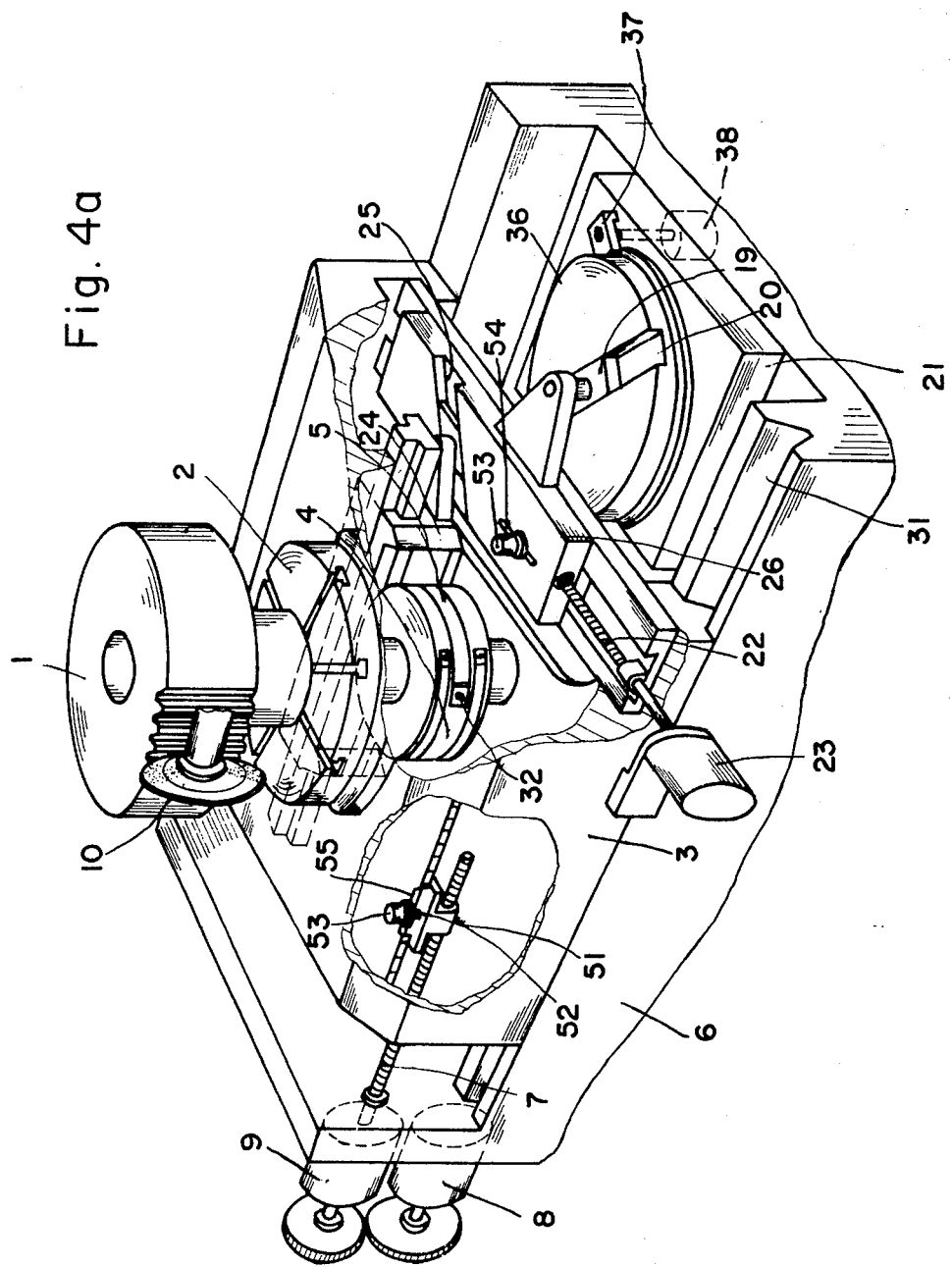
FIG. 4a is a perspective view of the device of FIG. 4.

Depending on the particular way in which the grinding machine is mounted on the generating machine, it may occur that the carriage 18 or the motor 23 and the adjacent portion of the machine table 3 collides with the stand (not shown) of the gear generating machine whereon the grinding wheel 10 is arranged. In order to avoid this, a slightly modified embodiment from the one shown in FIG. 3 will prove advantageous, which is illustrated in FIG. 4. In this embodiment the carriage 24 is shifted by 90° compared to the carriage 18 in FIG. 3 and is now arranged opposite the grinding wheel 10. To the carriage 24 the same motion is imparted which has been already explained in connection with FIG. 3, but this motion is here imparted through a guide way 25 in a slide 26 so that the 90°-shift of the direction of the carriage motion is achieved. In the guide way 25 slides a block 27 connected to the carriage 24.

This particular design makes it possible to make the distance between the slide 26 and/or the motor 23 on the one hand and the workpiece support 2 on the other hand (in the vertical direction of FIG. 4) great enough so that such collision will not occur.

Figure 7:
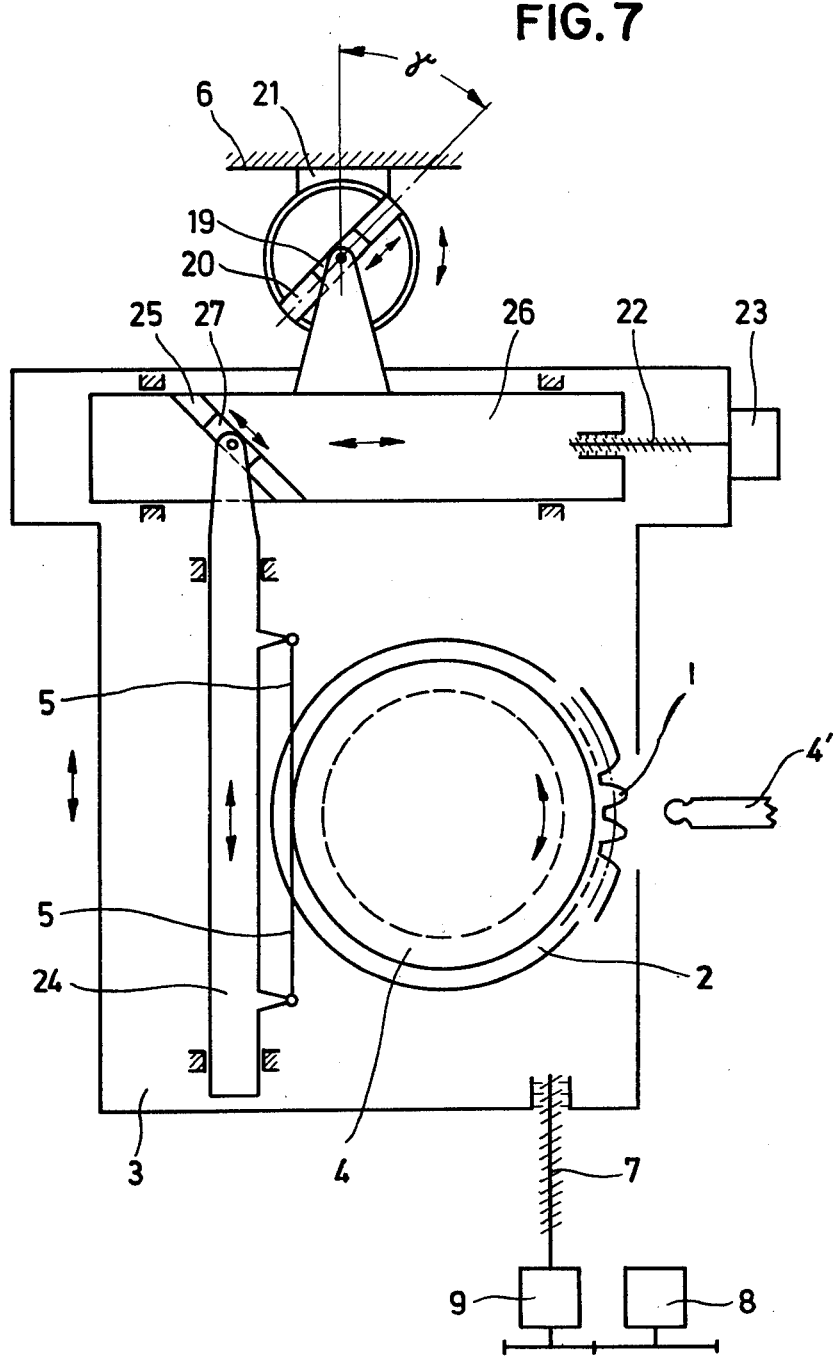
FIG. 7 shows schematically a gear testing arrangement.

FIG. 7 shows the same arrangement used for testing gears by substituting a feeler 10' for the wheel 10.

What is claimed is:

1. In a machine for operating on involute spur gears and helical gears wherein a workpiece performs a rolling-off motion relative to a tool, which rolling-off motion is composed of a component of a purely rotatory motion and a component of a purely rectilinear movement, said machine comprising a machine stand, a machine table mounted on said stand for rectilinear movement relative to a tool carrier, drive means for moving said machine table rectilinearly, and a workpiece support rotatable on said machine table about an axis perpendicular to the direction of such rectilinear movement and being rectilinearly movable therewith, means for producing said purely rotatory motion comprising:
   a. a guide way, means mounting said guide way on said machine stand for angular adjustment of its direction relative to the direction of the rectilinear table movement,
   b. mechanical means slidably mounted on said machine table, said mechanical means slidably engaging said guide way so as to be displaced laterally thereby when said table is moved along its rectilinear path, and
   c. means mechanically interconnecting said mechanical means and said workpiece support for deriving from said lateral movement of said mechanical means said rotatory motion of said workpiece support.

2. A machine as claimed in claim 1, wherein said mechanical means on said machine table is mounted thereon so as to be slidable at a right angle to the direction of said table movement.

3. A machine as claimed in claim 1, wherein said mechanical means on said machine table comprises
   a. a first element slidable at a right angle to the direction of the table movement and engaging directly said adjustable guide way, said first element being provided with a groove extending in a direction inclined to the direction of movement of said first element, and
   b. a second element displaceable on said machine table in the direction of the table movement and slidably engaging said groove in said first element so that said second element is displaced in the direction of said table movement when said first element is displaced in a direction perpendicular thereto.

4. A machine as claimed in claim 1, wherein said workpiece support is a cylinder and said means mechanically interconnecting said mechanical means and said cylinder comprises two straps, said straps having one end of each fixedly connected to opposite peripheral portions of said cylinder and the other ends connected, in a crosswise manner, to said mechanical means.

5. A machine as claimed in claim 1, said tool comprising a tracer mounted on said machine stand for tracing the involute shape of the tooth flanks of the manufactured gear.

6. In a machine for operating on involute spur gears and helical gears wherein a workpiece performs a rolling-off motion relative to a tool, which rolling-off motion is composed of a component of a purely rotatory motion and a component of a purely rotatory motion and a component of a purely rectilinear motion, said machine comprising:
   a. a machine stand
   b. a machine table element mounted on said stand for rectilinear movement in a first direction relative to a tool carrier.
   c. a workpiece support rotatable on said table element about an axis fixed with respect to the table element, said axis being perpendicular to the first direction and rectilinearly movable with said table element
   d. a guide way, means mounting said guide way on said machine stand for angular adjustment of its direction relative to said first direction
   e. a mechanical element mounted slidably on the machine table for movement with respect thereto in a second direction transverse to the first direction
   f. means mechanically interconnecting said mechanical element and said workpiece support for deriving from said lateral movement of said mechanical element said rotatory movement of said workpiece support
   g. means rigid with said mechanical element slidably engaging in said guide way and h. means to move one of said elements in one of said first and second directions, whereby said guide way produces movement of the other of said elements in the other of said first and second directions.

7. In a machine as claimed in claim 6, said mechanical element on said machine table element being mounted thereon so as to be slidable at a right angle to the direction of said table movement.

8. In a machine as claimed in claim 6, said tool comprising a tracer mounted on said machine stand for tracing the involute shape of the tooth flanks of the manufactured gear.

9. In a machine as claimed in claim 6, said workpiece support being a cylinder and said means mechanically interconnecting said mechanical element and said cylinder comprising two straps, said straps having one end of each fixedly connected to opposite peripheral portions of said cylinder and the other ends connected, in a crosswise manner, to said mechanical element.

* * * * *